Patented Sept. 23, 1952

2,611,756

UNITED STATES PATENT OFFICE 2,611,756

POLYVINYL RESIN PLASTICIZED WITH POLYESTER

Irving Pöckel, Cambridge, Mass., assignor to Cambridge Industries Company, Cambridge, Mass., a corporation of Massachusetts No Drawing. Application January 16, 1950, Serial No. 138,928

6 Claims. (Cl. 260—29.6)

This invention relates to resinous non-migrating plasticizers for polyvinyl acetate and polyvinyl alcohol compositions, and to the polyvinyl acetate and polyvinyl alcohol compositions plasticized therewith.

Because of their low cost, superior adhesive qualities and resistance to ultra-violet light, oxidation and ageing, polyvinyl acetate resins—suitably plasticized—have found wide usage as adhesives, and in coatings of all kinds. The available plasticizers which have been compatible with these polyvinyl acetate resins have been limited to the so-called chemical plasticizers, such as dibutyl phthalate and tricresyl phosphate. These plasticizers, because of their low molecular weight show some volatility at ordinary temperatures and will migrate out of films of the compound into such materials as paint and lacquer films, leather, paper, asphalt, etc., with which they may be in contact. This limitation of plasticizers to the chemical type has precluded the application of polyvinyl acetate resins to such uses as leather finishes, base coats for oil cloth, backing compounds for textiles and carpets, sealer coats for linoleum and asphalt-impregnated products, binders for non-woven fabrics, etc.

Suitably plasticized polyvinyl alcohol resins have also found many industrial applications. These applications are for the most part based on the resistance of polyvinyl alcohol to organic solvents, greases, fats, asphalt, etc., the rendering of polyvinyl alcohol films water-insoluble by treatment with certain chromium compounds or with dimethylol urea, and the superior toughness of polyvinyl alcohol compositions as well as their high impermeability to most gases.

The ester type, water-immiscible plasticizers commonly used with plastics are, however, not compatible with the completely hydrolyzed grades of polyvinyl alcohol, and they are also of but little use with the partially hydrolyzed grades. None of the water-insoluble resinous type non-migrating plasticizers has been found to be compatible with any of the polyvinyl alcohol type resins, even those grades which contain large proportions of residual acetate groups. The products which have been found to be most effective in imparting softness and flexibility to polyvinyl alcohol resins are some of the high boiling point, water-soluble organic compounds containing hydroxyl, amide and amino groups such as glycerine, ethylene glycol, ethanol acetamide, and triethanolamine hydrochloride. A defect of these materials is that they are all permanently water-soluble and will leach out of polyvinyl alcohol compositions which contain them, even though the polyvinyl alcohol may be insolubilized by treatment with chromium compounds or dimethylol urea. Since these compounds are all hygroscopic, a further defect inherent in their use is that the softness and flexibility of polyvinyl alcohol compositions containing them will vary greatly with the relative humidity of the surrounding atmosphere.

A primary object of the present invention is the embodiment of resinous type plasticizers which are free of the aforementioned defects, i. e., are compatible with an aqueous dispersion of polyvinyl acetate and with an aqueous dispersion of polyvinyl alcohol, especially partially hydrolyzed grades of polyvinyl alcohol, and will not migrate out of the films or other products made of the polyvinyl acetate or polyvinyl alcohol and plasticized therewith.

A further object of the invention is the embodiment of an aqueous dispersion of polyvinyl acetate compositions and an aqueous dispersion of polyvinyl alcohol compositions, especially of partially hydrolyzed grades of polyvinyl alcohol, having a plasticizer according to the present invention incorporated therein and suitable for practical applications, such as the preparation of plasticized films, coatings, articles, etc.

Further objects of the invention will be evident from the following examples setting forth presently preferred embodiments thereof, the said examples being however entirely illustrative and not at all limitative in character. In the said examples, parts by weight bear the same relation to parts by volume as does the kilogram to the liter. All temperatures are in degrees Fahrenheit, unless otherwise indicated.

Briefly stated, the foregoing objects are realized according to the present invention by the preparation and incorporation into a polyvinyl acetate composition and/or into a composition of a partially hydrolyzed grade of polyvinyl alcohol of the products of the reaction between adipic acid and diethylene glycol or dipropylene glycol. These reaction products may advantageously—especially when used for the plasticization of polyvinyl acetate—be fatty acid modified and/or polyhydric alcohol-modified. To this end, use may be made of up to 4% by weight, relative to the weight of the reaction products, of a vegetable oil fatty acid, such as soya bean oil fatty acids, and of up to 4% by weight, relative to the weight of the said reaction products, of an alcohol such as pentaerythritol. Other polyhydric alcohols such as glycerol, ethylene glycol, hexaline glycol, triethylene glycol, trimethanol propane, etc., and other polybasic acids such as succinic, sebacic, azelaic and maleic acids, and maleic, succinic and phthalic anhydrides may be used to modify these resinous plasticizers by the incorporation of minor amounts in the cook. Preferred products, however, are exemplified in the following examples.

Example 1

557 parts by weight of adipic acid and 443 parts by weight of diethylene glycol are placed in a stainless steel varnish kettle having a capacity of about 2000 parts by volume. The mixture is heated to a temperature of 450° over a period of 1½ hours and then maintained at this temperature for 2½ hours. On cooling, the pale viscous liquid has the following physical properties:

| | |
|---|---|
| Per cent non-volatiles | 100 |
| Viscosity (Gardner) | Z1-Z2 |
| Color (Gardner) | 6 |
| Acid number | 32 |
| Yield _____parts by weight | 848 |

It may be used as a plasticizer for polyvinyl acetate resinous compositions as well as for partially hydrolyzed polyvinyl alcohol compositions.

Example 2

1258 parts by weight of adipic acid, 84 parts by weight of pure pentaerythritol, and 900 parts by weight of diethylene glycol are placed in a 3-necked flask having a capacity of 3000 parts by volume, and heated to a temperature of 450° over a period of 1½ hours and then maintained at this temperature for a period of 2½ hours. On cooling 1841 parts by weight of a pale resinous mass are obtained having properties similar to those of the plasticizer described in Example 1 but having a much greater viscosity.

Example 3

1150 parts by weight of adipic acid, 366 parts by weight of distilled soya bean oil fatty acids and 988 parts by weight of diethylene glycol are placed in a 3-necked flask having a capacity of 3000 parts by volume, and heated in 1½ hours to a temperature of 450° and maintained at this temperature for 2½ hours. On cooling, 2089 parts by weight of a pale viscous liquid are obtained having properties similar to those of the plasticizer described in Example 1.

Example 4

1200 parts by weight of dipropylene glycol and 1200 parts by weight of adipic acid are placed in a 3-necked flask having a capacity of 3000 parts by volume, and heated to a temperature of 450° over a period of 1½ hours and maintained at this temperature for 2½ hours. On cooling, 1900 parts by weight of a pale viscous liquid are obtained having properties similar to those of the plasticizer described in Example 1.

Example 5

1258 parts by weight of adipic acid, 200 parts by weight of distilled soya bean oil fatty acids and 1040 parts by weight of diethylene glycol are placed in a three-liter, three-necked flask and heated in 1½ hours to a temperature of 450° and maintained at this temperature for 2½ hours. On cooling, 2074 parts by weight of a pale viscous liquid are obtained having properties similar to the plasticizer described in Example 1.

Example 6

1150 parts by weight of adipic acid, 366 parts by weight of distilled cottonseed oil fatty acids and 988 parts by weight of diethylene glycol are placed in a three-liter, three-necked flask and heated in 1½ hours to a temperature of 450° and maintained at this temperature for 2½ hours. On cooling, 2076 parts by weight of a pale viscous liquid are obtained having properties similar to the plasticizer described in Example 1.

Example 7

1150 parts by weight of adipic acid, 366 parts by weight of distilled soya bean oil fatty acids and 1250 parts by weight of dipropylene glycol are placed in a three-liter, three-necked flask and heated in 1½ hours to a temperature of 450° and maintained at this temperature for 2½ hours. On cooling, 2339 parts by weight of a pale viscous liquid are obtained having properties similar to the plasticizer described in Example 1.

Example 8

876 parts by weight of adipic acid, 294 parts by weight of maleic anhydride and 1050 parts by weight of diethylene glycol are placed in a three-liter, three-necked flask and heated in 1½ hours to a temperature of 233° C. and maintained at this temperature for 2 hours. On cooling, 1820 parts by weight of a pale viscous liquid are obtained having properties similar to the plasticizer described in Example 1 but having a much greater viscosity.

Example 9

1000 parts by weight of succinic anhydride and 1160 parts by weight of diethylene glycol are heated in a three-liter, three-necked flask in 1½ hours to a temperature of 450° and maintained at this temperature for 2½ hours. On cooling, a pale viscous liquid having properties similar to the plasticizer described in Example 1 is obtained.

Example 10

1000 parts by weight of succinic anhydride and 1470 parts by weight of dipropylene glycol are placed in a three-liter, three-necked flask, and heated in 1½ hours to a temperature of 450° and maintained at this temperature for 2½ hours. On cooling, a pale viscous liquid having properties similar to the plasticizer described in Example 1 is obtained.

Example 11

1258 parts by weight of succinic anhydride, 200 parts by weight of distilled soya bean oil fatty acids and 1550 parts by weight of diethylene glycol are placed in a three-liter, three-necked flask and heated in 1½ hours to a temperature of 450° and maintained at this temperature for a period of 2½ hours. On cooling, a pale viscous liquid having properties similar to the plasticizer described in Example 1 is obtained.

Example 12

1204 parts by weight of adipic acid, 183 parts by weight of soya bean oil fatty acids, 42 parts by weight of pure pentaerythritol and 940 parts by weight of diethylene glycol are placed in a three-liter, three-necked flask and heated to a temperature of 450° over a period of 1½ hours and maintained at this temperature for a period of 2½ hours. On cooling, 1915 parts by weight of a pale viscous liquid are obtained having properties similar to the plasticizer described in Example 1.

Example 13

1258 parts by weight of adipic acid, 62 parts by weight of glycerine and 900 parts by weight of diethylene glycol were placed in a three-liter, three-necked flask and heated to a temperature of 450° over a period of 1½ hours and maintained at that temperature for a period of 2½ hours. On cooling, 1827 parts by weight of a pale viscous liquid was obtained having similar properties to the plasticizer described in Example 1.

Example 14

1258 parts by weight of adipic acid, 200 parts by weight of diglycolic acid and 1213 parts by weight of diethylene glycol were placed in a three-liter, three-necked flask and heated in 1½ hours to a temperature of 450° and maintained at this temperature for 2½ hours. On cooling, 2270 parts by weight of a pale viscous liquid was obtained having properties similar to the plasticizer described in Example 1.

The plasticizers described in Examples 1 to 14 are all compatible with polyvinyl acetate and with polyvinyl alcohol and when films are laid down from a solution of, for example, the plasticized polyvinyl acetate they are transparent, have good gloss and are rubbery in nature. These films when overcoated with lacquer, drying oils, paints, varnishes, etc. show no migration of the resinous plasticizer. Similarly, polyvinyl alcohol compositions plasticized with these plasticizers show no tendency toward migration.

These resinous type plasticizers may easily be incorporated into polyvinyl acetate and polyvinyl alcohol compositions as shown by the following illustrative examples:

Example 15

40 parts by weight of the plasticizer described in Example 1 are stirred into 100 parts by weight of an emulsion of polyvinyl acetate containing 54% polyvinyl acetate resin. Considerable thickening of the emulsion takes place. This mixture is then thinned with 40 parts by weight of water to give a stable emulsion which yields films which are transparent and of a rubber-like nature.

Example 16

40 parts by weight of water are added slowly with stirring to 40 parts by weight of the plasticizer described in Example 1. 100 parts by weight of a polyvinyl acetate emulsion containing 54% polyvinyl acetate resin are then added to the emulsion of plasticizer and water to produce a stable emulsion which yields films similar to those described in Example 15.

Example 17

3 parts by weight of 28% ammonia water are stirred into 40 parts by weight of the plasticizer described in Example 1 until a clear solution is obtained. 40 parts by weight of water are then added and stirred until a clear solution is obtained. 100 parts by weight of a polyvinyl acetate emulsion containing 54% of polyvinyl acetate resin are added to the water solution of the plasticizer with stirring to produce a stable emulsion which yields films similar to those of Example 15.

Example 18

3 parts by weight of 28% ammonia water are stirred into 40 parts by weight of the plasticizer described in Example 4 until a clear solution is obtained. 40 parts by weight of water are then added and stirred until a clear solution is obtained. 100 parts by weight of a polyvinyl acetate emulsion containing 54% of polyvinyl acetate resin are added to the water solution of the plasticizer with stirring to produce a stable emulsion which yields films similar to those of Example 15.

Example 19

18 parts by weight of lampblack, 104 parts by weight of yellow iron oxide and 345 parts by weight of the plasticizer described in Example 1 are mixed together to yield a viscous paste having an olive drab color. This paste is then ground on a three-roll paint mill until a smooth dispersion is obtained. 17 parts by weight of 28% ammonia water are then added with stirring to 367 parts by weight of the above paste and mixed until a homogeneous mass is obtained. 175 parts by weight of water are then added and the paste is stirred until the mixture is uniform. 470 parts by weight of a polyvinyl acetate emulsion containing 54% of polyvinyl acetate resin are then added with stirring to yield a coating compound which is suitable for impregnating cotton sheeting over which a coating of drying oil can be applied.

Example 20

Cotton sheeting, of the type known as airplane fabric, having a warp count of 80 and a filling count of 80 and weighing 3.7 ounces per square yard, is impregnated with the coating compound described in Example 19 and dried by festooning at 150° C. to remove the water. The sheeting increases in weight by 2.4 ounces per square yard and is substantially sealed. This coated fabric is then coated evenly on each side, using a double doctor knife coating machine, with a pigmented coating composition consisting of the following:

| | Parts by weight |
|---|---|
| Lampblack | 47 |
| Yellow iron oxide | 270 |
| Heat bodied oil | 1232 |
| Cobalt naphthenate Soln. (6% Co) | 3.5 |
| Lead naphthenate Soln. (24% Pb) | 35.0 |
| Antiskinning agent (National Aniline Div. ASA) | 6.0 |

The heat bodied oil is prepared by heating 180 parts by weight of China-wood oil in a stainless steel varnish kettle of a capacity of about 3000 parts by volume to a temperature of 500° in 1½ hours. At this time, the kettle is removed from the fire, 36 parts by weight of Z-3 bodied (Gardner) linseed oil added, and the temperature allowed to fall below 450°. The heat bodied oil is then thinned with 65 parts by weight of mineral spirits.

The coated fabric is now festooned in a steam room and cured at 150° for 10 hours. A total increase in weight of 1.4 ounces per square yard of this oil top coat is obtained, yielding a coated fabric having a weight of 7.5 ounces per square yard. This coated fabric has superior flexibility, drape and tear resistance relative to ordinary oil-impregnated cotton sheeting and because of the inertness of the polyvinyl acetate base coat has superior ageing characteristics.

Example 21

7 parts by weight of 28% ammonia water are added to 100 parts by weight of the plasticizer described in Example 1. This mixture is stirred until a clear solution is obtained. The product is then added, with stirring, to 4000 parts by weight of a 5% solution of a 77% hydrolyzed polyvinyl acetate resin; 77% of the acetate groups are hydrolyzed to provide a polyvinyl alcohol derived from polyvinyl acetate. Films cast from the resultant solution are clear and transparent and possess rubber-like characteristics.

*Example 22*

7 parts by weight of 28% ammonia water are added to 100 parts by weight of the plasticizer described in Example 2. This mixture is stirred until a clear solution is obtained. The product is then added, as in Example 21, to 4000 parts by weight of a 5% solution of a 77% hydrolyzed polyvinyl acetate resin; i. e. a polyvinyl alcohol derived from polyvinyl acetate in which about 77% of the acetate groups have been hydrolyzed. Films cast from the resultant solution are clear and transparent and have rubber-like characteristics.

*Example 23*

100 parts by weight of a 47% hydrolyzed grade of polyvinyl acetate (a polyvinyl alcohol in which 40% of the acetate groups have been hydrolyzed from starting polyvinyl acetate) and 50 parts by weight of the plasticizer described in Example 1 are dispersed in an excess of hot methyl alcohol. After uniform dispersion is realized, the methyl alcohol is evaporated off, leaving a clear rubbery mass. This rubbery mass is then milled on a hot rubber mill to remove occluded methyl alcohol, and is sheeted out. The product may be molded or extruded for tubing, gaskets, etc., which have the excellent solvent resistance of polyvinyl alcohol without the poor moisture-sensitivity of polyvinyl alcohol plasticized with glycerine or other water-soluble plasticizer. The composition may be press-polished to yield protective films of all sorts.

Products having essentially similar properties are obtained by replacing the plasticizer used in Examples 15 to 23 by the corresponding amount of any of the other plasticizers precedingly disclosed.

As indicated hereinabove, in the aqueous dispersions of hydrolyzed polyvinyl acetate resins up to 77% hydrolysis of polyvinyl acetate, and polyvinyl acetate, plasticized as set forth in Examples 15—23, the plasticizer may be modified with up to 4% of a polyhydric alcohol and up to 14% of a vegetable oil fatty acid. The amount of added polyhydric alcohol and of added vegetable oil fatty acid may be 0%, and up to 4% of the alcohol and may be 0% of vegetable oil fatty acid and up to 14% of the vegetable oil fatty acid.

Films prepared from the compositions prepared according to the preceding examples may be soaked, for instance in toluol, without any noticeable effect.

Having thus disclosed the invention, what is claimed is:

1. A composition of matter comprising essentially an aqueous dispersion of a member selected from the group consisting of partially hydrolyzed polyvinyl acetate in which up to 77% of the polyvinyl acetate groups have been hydrolyzed and polyvinyl acetate, said dispersion being plasticized with a non-migrating, viscous liquid resinous plasticizer, said plasticizer consisting of the product of reaction between a member selected from the group consisting of adipic acid and succinic anhydride and a member selected from the group of diethylene glycol and dipropylene glycol, with up to 4% of another polyhydric alcohol and with up to 14% of a vegetable oil fatty acid.

2. A composition of matter comprising essentially an aqueous dispersion of polyvinyl acetate, said dispersion being plasticized with a non-migrating viscous liquid resinous plasticizer consisting of the product of reaction between adipic acid and diethylene glycol.

3. A composition of matter comprising essentially an aqueous dispersion of polyvinyl acetate, said dispersion being plasticized with a non-migrating viscous liquid resinous plasticizer consisting of the product of reaction between adipic acid and dipropylene glycol.

4. A composition of matter comprising essentially an aqueous dispersion of a partially hydrolyzed polyvinyl acetate, in which up to 77% of the polyvinyl acetate groups have been hydrolyzed, said dispersion plasticized with a non-migrating viscous liquid resinous plasticizer consisting of the product of reaction between adipic acid and diethylene glycol.

5. A composition of matter comprising essentially an aqueous dispersion of a partially hydrolyzed polyvinyl acetate, in which up to 77% of the polyvinyl acetate groups have been hydrolyzed, said dispersion being plasticized with a non-migrating viscous liquid resinous plasticizer consisting of the product of reaction between adipic acid and dipropylene glycol.

6. A composition of matter comprising essentially an aqueous dispersion of polyvinyl acetate, said dispersion being plasticized with a non-migrating viscous liquid resinous plasticizer consisting of the product of reaction between succinic anhydride and diethylene glycol.

IRVING PÖCKEL.

REFERENCES CITED

The following references are of record in the file of this patent:

UNITED STATES PATENTS

| Number | Name | Date |
|---|---|---|
| 2,448,585 | Fuller | Sept. 7, 1948 |

FOREIGN PATENTS

| Number | Country | Date |
|---|---|---|
| 368,611 | Italy | Feb. 20, 1939 |
| 490,543 | Great Britain | Aug. 17, 1938 |
| 586,826 | Great Britain | Apr. 1, 1947 |

OTHER REFERENCES

De Bell et al.: German Plastics Practice, pages 227 and 228, published 1946 by De Bell and Richardson.

Dupont Technical Data Bulletin No. 4-243, received in Patent Office November 1943. 260-29.1.